United States Patent [19]

Morimoto et al.

[11] 4,097,985
[45] Jul. 4, 1978

[54] METHOD OF MANUFACTURING A SOLID ELECTROLYTE CAPACITOR

[75] Inventors: Koichi Morimoto; Tatsuo Tokumaru, both of Tokyo, Japan

[73] Assignee: Nippon Electric Co., Ltd., Tokyo, Japan

[21] Appl. No.: 763,660

[22] Filed: Jan. 28, 1977

[30] Foreign Application Priority Data

Jan. 30, 1976 [JP] Japan .................................. 51-9064

[51] Int. Cl.² .............................................. H01G 9/05
[52] U.S. Cl. ......................................... 29/570; 36/433
[58] Field of Search ........................... 29/570; 361/433

[56] References Cited

U.S. PATENT DOCUMENTS 3,588,627    6/1971    Markarian .......................... 361/433

Primary Examiner—Gerald A. Dost

[57] ABSTRACT

A method of manufacturing a solid electrolyte capacitor, an anode terminal of which is directly attached to a portion of an anode body of porous valve-metal characteristically includes the steps of selectively exposing a predetermined portion of the anode body, and providing the anode terminal to the predetermined portion of the anode body, where the porous valve metal and oxide thereof co-exist, by using conductive material other than the valve-metal of the anode body.

4 Claims, 15 Drawing Figures

METHOD OF MANUFACTURING A SOLID ELECTROLYTE CAPACITOR

BACKGROUND OF THE INVENTION

Figure 1:
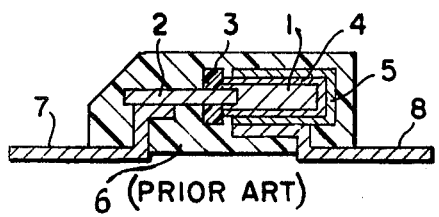
Figure 2A:
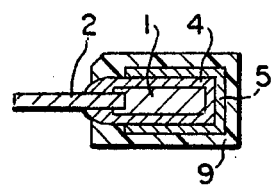
Figure 2B:
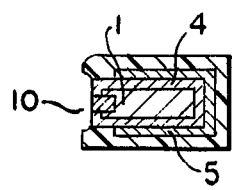
Figure 2C:
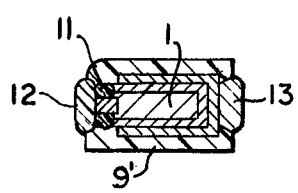
Figure 2D:
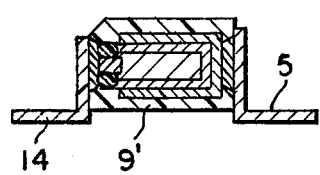

This invention relates to a method of manufacturing solid electrolyte capacitors, and more particulary to a method of forming an anode terminal thereof. The usual method of manufacturing chip-type solid electrolyte capacitors as shown in FIG. 1 is as follows. At first, a sintered anode body 1 of a porous valve-metal such as tantalum having a wire 2 of the same valve-metal is formed. In this respect, this sintered anode body 1 is formed by the steps of molding a powder of valve-metal into a predetermined lump having the embedded wire 2 of the same valve-metal and sintering the lump into the anode body, or by the steps of molding a powder of valve-metal into a lump, sintering the limp into the anode body and welding the wire 2 of the same valve-metal to the anode body 1. Then, Teflon ring 3 is inserted to the wire to its root. Then, valve-metal oxide is formed over the entire surface of the sintered anode body by anodic oxidation, and a solid electrolyte layer 4 such as $MnO_2$ layer is coated thereover. A cathode conductive layer 5 consisting of a graphite layer, a silver paste layer and a solder layer is formed successively over the solid electrolyte layer 4. Then, an anode terminal 7 of wettable or solderable metal is welded to the wire 2, and a cathode terminal 8 is soldered to the cathode conductive layer 5. Finally, a plastic enclosure 6 is formed. However, in such conventional method, crawling of solid electrolyte material to the anode wire 2 is unavoidable during the formation of the solid electrolyte layer 4. Accordingly, in view of the crawling of the solid electrolyte material and deviation thereof, a gap of at least 1mm is needed between the root of the anode wire 2 and the junction of the anode terminal 7 to the anode wire 2. This gap has been a major obstacle to reduce the size of capacitor, especially of a chip-type capacitor.

It is an object of this invention to provide a method of manufacturing solid electrolyte capacitors which are excellent in volumetric efficiency.

It is another object of this invention to provide a method of manufacturing chip-type solid electrolyte capacitors with a high efficiency.

In the method of the present invention, an anode body of a porous valve-metal is prepared, and a dielectric layer is formed over the entire surface of the anode body by anodic oxidation. Next, a solid electrolyte layer and a predetermined cathode layer composed of; for example, graphite layer and silver paste layer are formed over the surface of the dielectric layer. Then a predetermined portion of the anode body is exposed by selectively removing the solid electrolyte and cathode layers and the dielectric layer in the predetermined portion where an anode terminal is to be provided. Next, the boundary of the exposed portion of the solid electrolyte and cathode layers is covered with insulating resin. And then, an anode terminal is attached to the exposed portion of the anode body, by using a metal or metals or other conductive materials other than the valve-metal of the anode. A cathode terminal is attached to the cathode layer and encapsulation, is done according to the intended purpose, whereby the solid electrolyte capacitor of the present invention is gained.

The solid electrolyte capacitor according to the present invention is characterized in that the anode terminal is directly attached to the selectively exposed surface of the anode body especially of the porous valve metal by using a conductive material, other than the valve-metal of the anode body, such as silver paste, a solder adhesive to ceramics and a conductive organic polymer.

According to th present invention, the volume or size of the solid eletrolyte capacitor can be decreased to a large extent.

FIG. 1 is a sectional view showing a conventional solid electrolyte capacitor.

FIGS. 2 (a) to 2 (d) are cross-sectional views illustrating the steps of a process for manufacturing a solid electrolyte capacitors according to a first embodiment of the invention.

FIGS. 3 (a) to 3 (g) show the steps of a process for manufacturing a solid electrolyte capacitor according to a second embodiment of the present invention, wherein FIG. 3 (a) is a perspective view and FIGS. 3 (b) to 3 (g) are cross-sectional views.

FIGS. 4 (a) to 4 (c) show the steps of a process for manufacturing a solid electrolyte capacitor according to another embodiment of the present invention, wherein FIGS. 4 (a) is a perspective view and FIGS. 4 (b) and 4 (c) are crosssectional views.

At first, first embodiment of the invention will be described with reference to FIGS. 2 (a) to 2 (d). In this example, a solid electrolyte capacitor having rating characteristics of 6.3 W.V and 2.2 $\mu$F is finally gained.

Tantalum powder of 7,000 CV/gr is molded into a rectangular pellet 1 of D.g 7.3 (gr/cm$^3$) with 0.3 mm$\phi$ tantalum wire 2 embeded therein, the dimensions of which are 1.8 mm in length, 1.7 mm in width and 0.4 mm in thickness, then the rectangular pellet 1 is sintered in vacuum and at a high temperature over 1000° C for a predetermined time. Successively the sintered pellet, namely anode body, 1 is anodically oxidized by using the wire 2 as an electric current path to form the dielectric layer of tantalum oxide (not shown) over the entire surface. After the anodic oxidation, a solid electrolyte layer 4 of manganese dioxide is formed over the dielectric layer (not shown) by a thermal decomposition of manganese nitrate. After the formation of the semiconductor layer 4, a cathode conductive layer 5 constituting of a graphite layer, silver paste layer and solder layer is formed over the solid electrolyte layer 4 in a manner that the sintered pellet 1 is soaked in a solution of graphite for forming the graphite layer, dippd in a solution and baked for forming silver paste layer, and dippd in melted solder for forming the solder succeedingly. Then the capacitor elements thus gained are wholly mold-coated with epoxy resin 9 (FIG. 2 (a)). Further, to provide space for formation of the anode terminal of the resincoated capacitor element, the wire 2 is removed by mechanical grinding from its one end to a portion 10 near its root, and the section of the lead wire, as part of the anode metal, is exposed for connecting an anode terminal thereto (FIG. 2 (b)). After that, said element is soaked in a warm water bath containing 5% citric acid to etch an approximately 0.1 mm thickness of $MnO_2$ baked on the dielectric layer of the surface of the wire 2, off the ground part thereby to prevent short-circuiting between the anode and the cathode. And after completion of the washing and drying of the dissolved part 11 and filling an insulating resin 9' therein, a solder layer 12 is provided here, consisting of a special type of solder that can be bonded with tantulum wire (for instance "Cerasolzer", a product of Asahi Glass Co., Ltd. Tokyo, Japan). On the cathode side, at the same time, an additional solder layer 13 which is adequate for connection of a cathode terminal is formed on the existing solder layer exposed by removing a portion of the epoxy resin 9 (FIG. 2 (c)). High-temperature solder is used in the solder layers 12 and 13 to prevent them from melting during the subsequent soldering of anode and cathode terminals on a printed plate or anything else. Next, an anode terminal 14 and a cathode terminal 15 are bonded with the high-temperature solder layers 12 and 13 by thermocompression. The volume of solid tantulum chip electrolyte capacitor not including its terminals, is approximately 12.8 mm³, 63 percent of the volume of a similar capacitor produced by the conventional method.

Figure 3A:
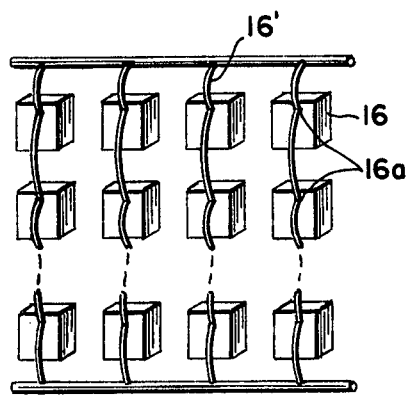
Figure 3D:
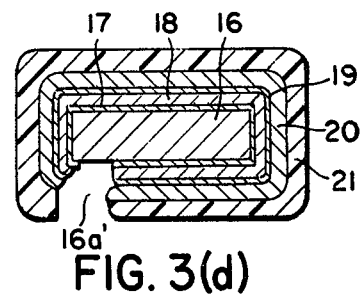
Figure 3E:
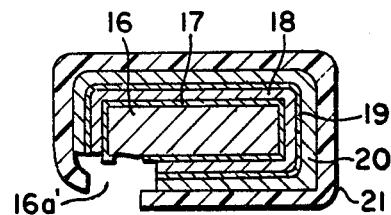
Figure 3B:
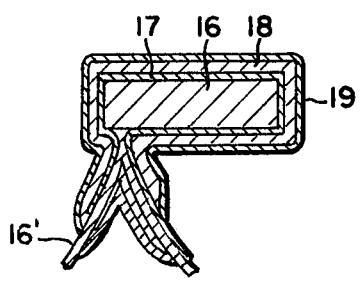
Figure 3F:
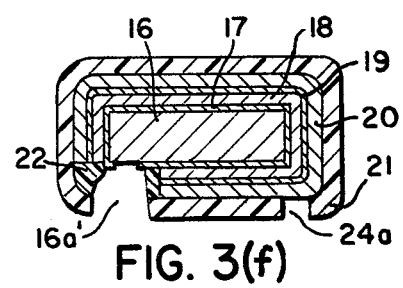
Figure 3C:
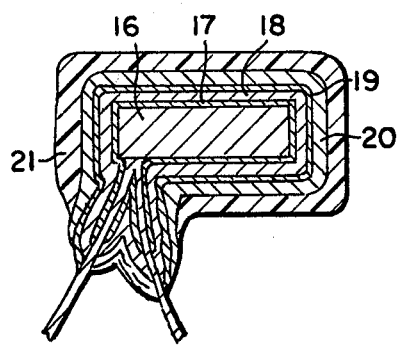
Figure 3G:
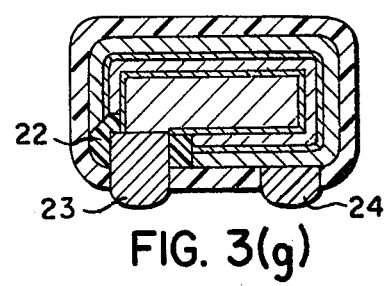

A second embodiment of the present invention will be described below with reference to FIGS. 3 (a) through 3 (g). Tantalum powder of 7,000 CV/gr is molded into a rectangular pellet of D.g 7.3 (gr/cm³), the dimensions of which are 1.6mm in length, 1.5mm in width and 0.5mm in thickness respectively. After sintering the rectangular pellet into a sintered pellet 16 as an anode body in vacuum and at a high temperature, a plurality of the sintered pellets 16 are synthesized into a batch by lightly welding tantalum wire 16' to a predetermined portion 16a of the respective sintered pellet 16 as shown in FIG. 3(a). The predetermined portion 16a is intended to be a contact surface to the anode body.

After the batch of sintered pellets 16 are soaked in a forming fluid such as a 3% aqueous solution of ammonium citrate and subjected to a voltage such as DC 200V to produce an anodized layer of tantalum oxide 17 as a dielectric layer on each of them, the whole batch are soaked in a manganese nitrate solution, taken out and pyrolized in a constant-temperature tank, with this soaking-pyrolisis procedure being repeated several times to form manganese dioxide layer 18 as a solid electrolyte layer. Next, after a cathode conductive layer 19 is formed by depositing graphite layer and silver paste layer successively all over the pellets 16 (FIG. 3(b)), the whole batch are coated with solder 20 by dipping them into a solder bath, and then sheathed with epoxy resin 21 all over the pellets 16 (FIG. 3(c)). Then, the tantalum wire 16' is removed from the pellet 16 at the weld portion 16a by mechanically grinding or abrading (FIG. 3(d)) to expose a portion of the anode body 16, and the pellet is soaked in an aqueous solution of 10% hydrochloric acid and 20% hydrogen peroxide to remove the manganese dioxide layer 18 and the cathode conductive layer 19 in the surrounding of the wire-removed part 16a', whereby the tantalum oxidized layer 17 is exposed in said deprived part (FIG. 3(e)). After that, the exposed side walls of the electrolyte layer 18, the cathode layer 19 and the solder layer 20 at the boundary of the deprived part are again coated with a small quantity of low-viscosity insulating resin 22. The exposed surface of the pellet 16 is lightly reground, and a cathode contact hole 24a is opened by mechanically grinding in the part of the resin layer 21 where the cathode terminal is to be formed (FIG. 3(f)). The exposed surface of the anode body 16 is coated with a silver paste, which is then dried and baked, and a solder ball is inserted into the deprived part 16a, melted and bonded via the silver paste to the anode body 16 to form the anode terminal 23. Simultaneously with this last process, another solder ball is inserted into the cathode contact hole 24a, melted and bonded to the cathode solder layer 20 to form the cathode terminal 24 (FIG. 3(g)). The volume of the chip-type solid tantalum electrolyte capacitor produced in this manner is about 8.4mm³, 41 percent of the volume of a similar capacitor produced by the conventional method.

The series of processes in this embodiment can be performed on capacitor elements regularly arranged on a jig even after they have been disengaged from the batch, and readily permits performance by an automatic machine with a combined use of a feeder, thereby making possible automation of the whole production process. Because of its suitability for labor-saving operation, this method can obviously contribute to substantial reduction of man-hours required.

The external dimensions of the capacitors produced by the embodiments are listed in Table 1.

Table 1

|  | Conventional method | 1st Embodiment | 2nd Embodiment |
|---|---|---|---|
| Product rating | (FIG. 1) 6.3V 2.2μF | (FIG. 2) 6.3V 2.2μF | (FIG. 3) 6.3V 2.2μF |
| External dimensions (length × width × thickness) (mm) | 4.6×2.6×1.8 | 2.9×2.6×1.7 | 2.5×2.4×1.4 |
| Volume (mm³) | 20.5 | 12.8 | 8.4 |
| Volume ratio | 1 | 0.63 | 0.41 |

While, in the embodiment described above, resin is removed by mechanical grinding in the parts where the anode and cathode terminals are to be formed, some other method can obviously be applied, such as selective molding of the resin in advance or a chemical process of removal.

Figure 4A:
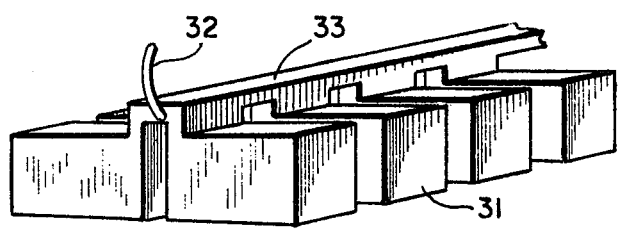
Figure 4B:
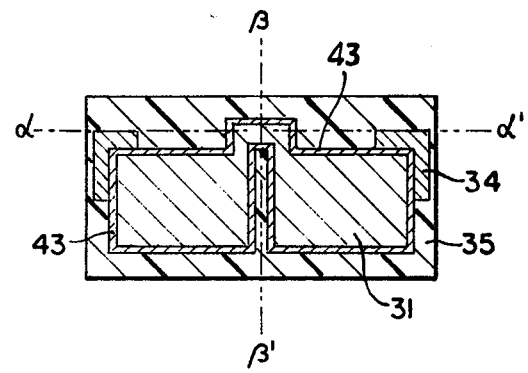
Figure 4C:
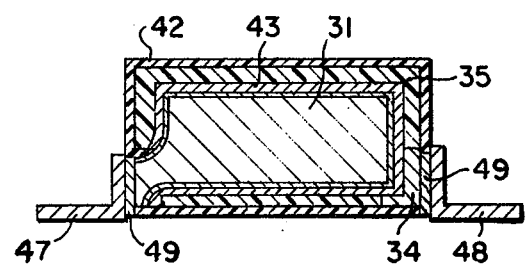

Another embodiment of the present invention will be described with reference to FIGS. 4(a) to 4(c). In this embodiment, a plurality of sintered anode pellets 31 of tantalum are formed in one block at the same time, wherein the anode pellets 31 are connected each other by way of a bar portion 33 of tantalum formed integrally with the anode pellets 31. Both the ends of the bar portion 33 are provided with tantalum wires 32 by welding for providing electric current to the anode pellets 31. A dielectric layer of tantalum oxide, a solid electrolyte layer of manganese dioxide (not shown) and a graphite layer, a silver paste layer and a solder layer for a cathode conductive layer are formed successively over the pellets 31 and the bar 33 in the same manner as in the former embodiments, thereby providing a cathode conductive layer 43. A cathode terminal contact member 34 is attached to a predetermined portion of the solder layer of each anode pellet 31, and then all the pellets 31 are coated with epoxy resin 35 by molding. Then, anode pellets 31 are separated from each other by cutting the bar portion 33 in lines α - α' and β - β', as shown in FIG. 4(b). Then, the cathode conductive layer 43 is partially etched away at the cut portion of the anode body in the same manner as in the former embodiments, and an anode terminal 47 and a cathode terminal 48 are attached to the exposed surface of the anode pellet 31 at the cut portion and to the cathode terminal contact member 34, respectively, by way of silver paste 49. Then, the capacitor element is further coated with epoxy resin 42. In this respect, the resin 42 should fill the etched away portion of cathode conductive layer 43 at the cut portion, as shown in FIG. 4(c).

According to the method shown in this embodiment, in addition to the advantage of volume reduction of the capacitors, the production efficiency can be increased.

We claim:

1. A method of manufacturing a solid electrolyte capacitor comprising the steps of preparing an anode body of valve-metal provided with means for supplying electric current thereto, forming a dielectric layer over the surface of said anode body by anodic oxidation, forming a solid electrolyte layer and cathode conductive layer over said dielectric layer, selectively removing a predetermined portion of said solid electrolyte layer, cathode conductive layer and dielectric layer to partially expose the surface of said anode body, coating the surface of said cathode conductive layer near said predetermined portion, and attaching an anode terminal to said exposed surface of said anode body by way of a conductive connecting means.

2. A method of claim 1, wherein said means for supplying electric current includes wire of said valve metal attached to said anode body and said predetermined portion is a place where said wire is attached to.

3. The method of claim 1, wherein said means for supplying electric current includes a bar of said valve metal which is integral with said anode body.

4. A method of manufacturing a solid electrolyte capacitor comprising the steps of preparing an anode body of porous valve-metal with wire of said valve metal attached thereto, anodically oxidizing the surface of said anode body to form a dielectric layer, forming solid electrolyte layer over said dielectric layer, forming a cathode conductive layer over said solid electrolyte layer, selectively exposing the surface of said anode body by removing said wire, selectively removing a part of said solid electrolyte and cathode conductive layers in said exposed surface to form an insulating space, filling an insulating resin to said insulating space, and attaching an anode terminal to said exposed surface by way of conductive connecting means.

* * * * *